US012768316B2

(12) United States Patent
Avoyne et al.

(10) Patent No.: US 12,768,316 B2
(45) Date of Patent: Oct. 20, 2026

(54) TRIPLE-FLOW AXIAL TURBOMACHINE WITH HEAT EXCHANGER

(71) Applicant: SAFRAN AIRCRAFT ENGINES, Paris (FR)

(72) Inventors: Valentin Sébastien Simon Avoyne, Samois sur Seine (FR); Bruno Albert Beutin, Evry (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 58 days.

(21) Appl. No.: 19/114,108

(22) PCT Filed: Sep. 14, 2023

(86) PCT No.: PCT/EP2023/075307
§ 371 (c)(1),
(2) Date: Mar. 21, 2025

(87) PCT Pub. No.: WO2024/061737
PCT Pub. Date: Mar. 28, 2024

(65) Prior Publication Data

US 2026/0098509 A1 Apr. 9, 2026

(30) Foreign Application Priority Data

Sep. 23, 2022 (FR) ....................................... 2209649
Sep. 23, 2022 (FR) ....................................... 2209651

(51) Int. Cl.
*F02K 3/115* (2006.01)
*F02C 7/14* (2006.01)
(Continued)

(52) U.S. Cl.
CPC ................ *F02K 3/115* (2013.01); *F02C 7/14* (2013.01); *F02C 7/25* (2013.01); *F02K 3/077* (2013.01)

(58) Field of Classification Search
CPC .... F02C 6/206; F02C 7/14; F02C 7/25; F02K 3/115; F02K 3/077; F05D 2220/323;
(Continued)

(56) References Cited

U.S. PATENT DOCUMENTS 9,677,474 B2 6/2017 Hundley, Jr et al.
11,448,132 B2 9/2022 Wiedenhoefer et al.
(Continued)

FOREIGN PATENT DOCUMENTS

BE 20215978 B1 7/2023
BE 20215979 A1 7/2023
(Continued)

OTHER PUBLICATIONS

International Search Report for PCT/EP2023/075307, dated Nov. 10, 2023, 4 pages.
(Continued)

*Primary Examiner* — Devon C Kramer
*Assistant Examiner* — Henry Ng
(74) *Attorney, Agent, or Firm* — RANKIN, HILL & CLARK LLP

(57) ABSTRACT

A turbomachine includes a first separation lip capable of separating an incoming air flow into a radially internal air flow and a secondary air flow; a second separation lip capable of separating the radially internal air flow into a primary flow and a tertiary flow traveling through a tertiary flow vein radially external to a primary flow vein traveled by the primary flow; a heat exchanger arranged in the tertiary flow vein; and an internal casing. The exchanger includes a body and a flange extending radially internally and projecting from the body, the flange being fixed to the internal casing, the exchanger including downstream of the flange, a downstream part to which is attached a fire wall forming a heat shield.

15 Claims, 5 Drawing Sheets

(51) Int. Cl.
*F02C 7/25* (2006.01)
*F02K 3/077* (2006.01)

(58) Field of Classification Search
CPC ............. F05D 2240/15; F05D 2240/55; F05D 2260/213; F05D 2260/98
USPC .......................................... 165/41, 42, 43, 44
See application file for complete search history.

(56) References Cited

U.S. PATENT DOCUMENTS

| | | | | |
|---|---|---|---|---|
| 12,031,504 | B2 * | 7/2024 | Miller | F02K 3/06 |
| 2008/0095611 | A1 * | 4/2008 | Storage | F28F 1/022 415/116 |
| 2017/0023017 | A1 * | 1/2017 | Dreischarf | B64D 29/00 |
| 2017/0298763 | A1 * | 10/2017 | Olver | F01D 25/12 |
| 2018/0023906 | A1 * | 1/2018 | Tajiri | F16K 31/002 60/806 |
| 2018/0245605 | A1 * | 8/2018 | Dreischarf | F04D 29/644 |
| 2018/0328285 | A1 * | 11/2018 | Tajiri | F28F 1/325 |
| 2020/0040765 | A1 * | 2/2020 | Walsh | F02C 7/125 |
| 2020/0200088 | A1 * | 6/2020 | Weicker | B33Y 80/00 |
| 2021/0108597 | A1 | 4/2021 | Ostdiek et al. | |
| 2021/0115854 | A1 * | 4/2021 | Pikovsky | F02C 7/143 |
| 2022/0282670 | A1 * | 9/2022 | Niergarth | F02C 7/18 |
| 2022/0403780 | A1 * | 12/2022 | Price | F02C 7/14 |
| 2024/0141835 | A1 * | 5/2024 | Niergarth | F02C 7/185 |

FOREIGN PATENT DOCUMENTS

| | | | |
|---|---|---|---|
| BE | 20215980 | A1 | 7/2023 |
| BE | 20215982 | A1 | 7/2023 |
| BE | 20215983 | A1 | 7/2023 |
| EP | 3674531 | A1 | 7/2020 |
| FR | 3089248 | A1 | 6/2020 |

OTHER PUBLICATIONS

Written Opinion for PCT/EP2023/075307, dated Nov. 10, 2023, 9 pages.

* cited by examiner

[Fig 1]
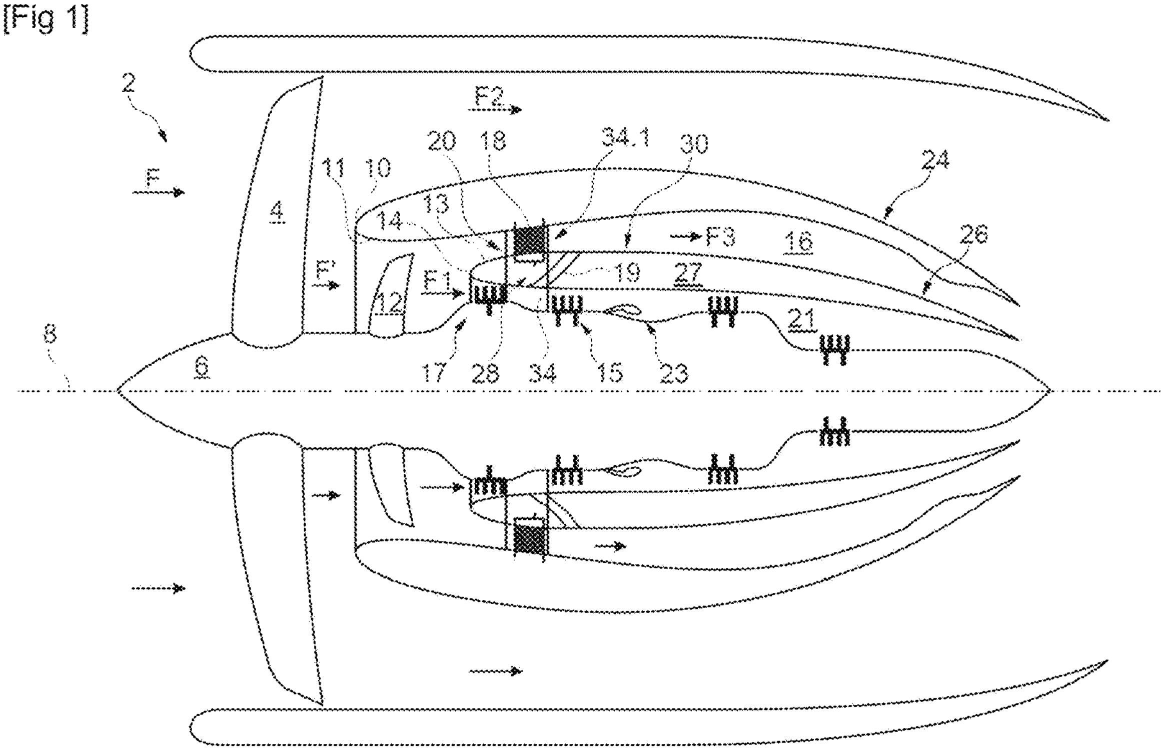
[Fig 2]
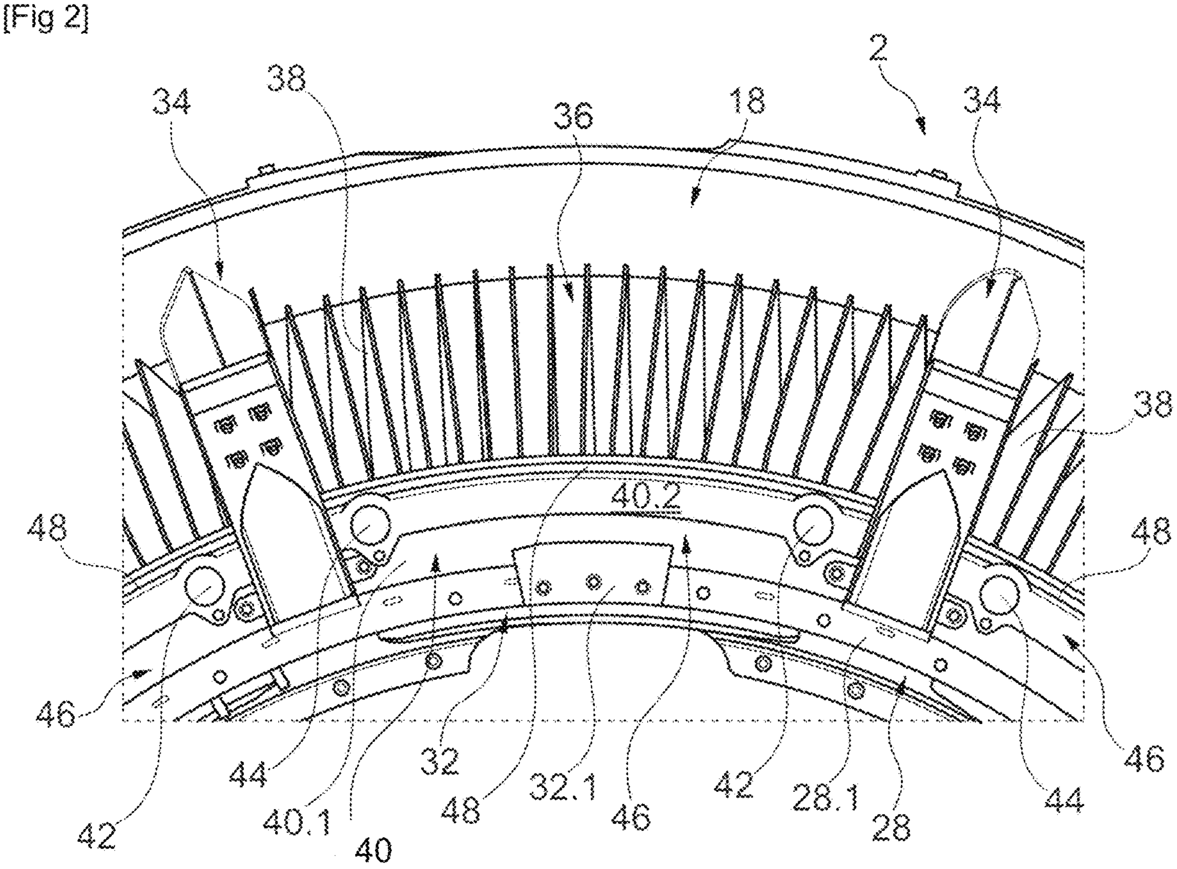

[Fig 3]
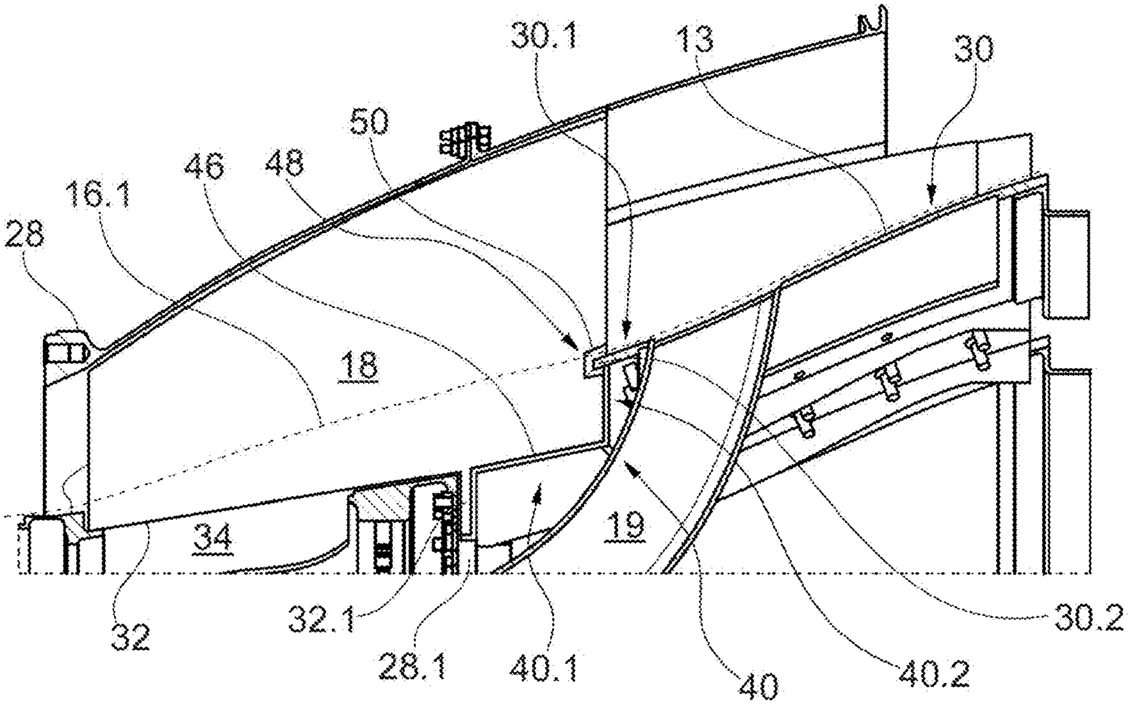
[Fig 4]
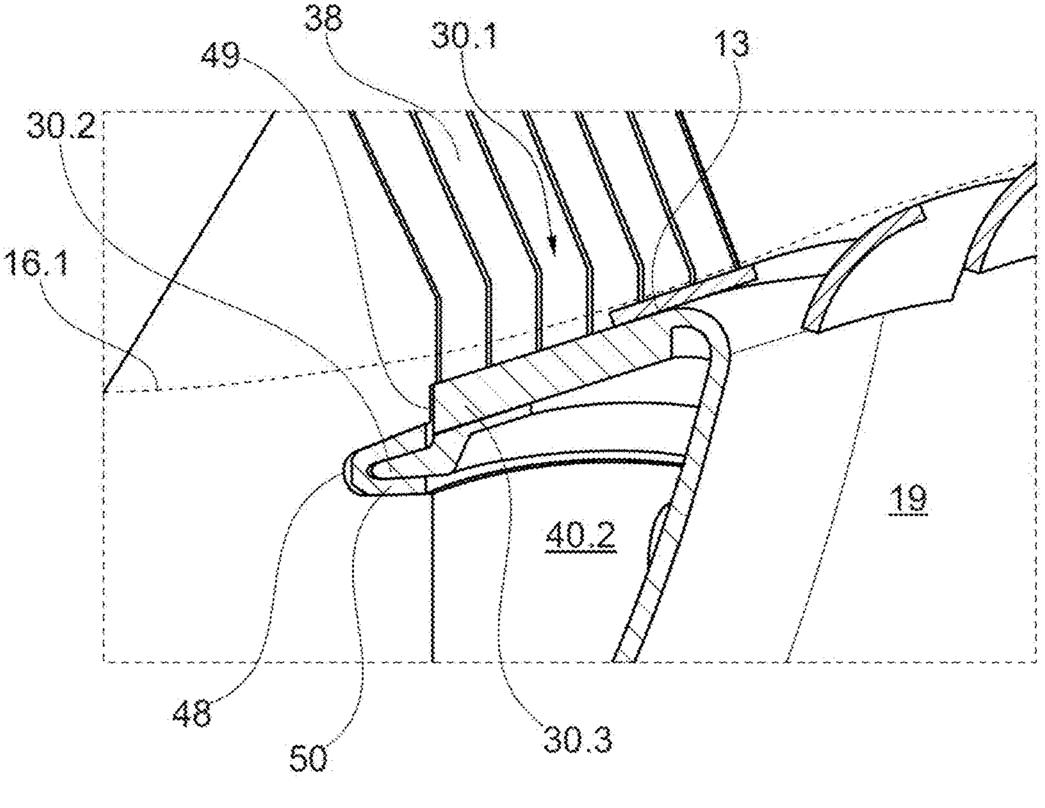

[Fig 5]
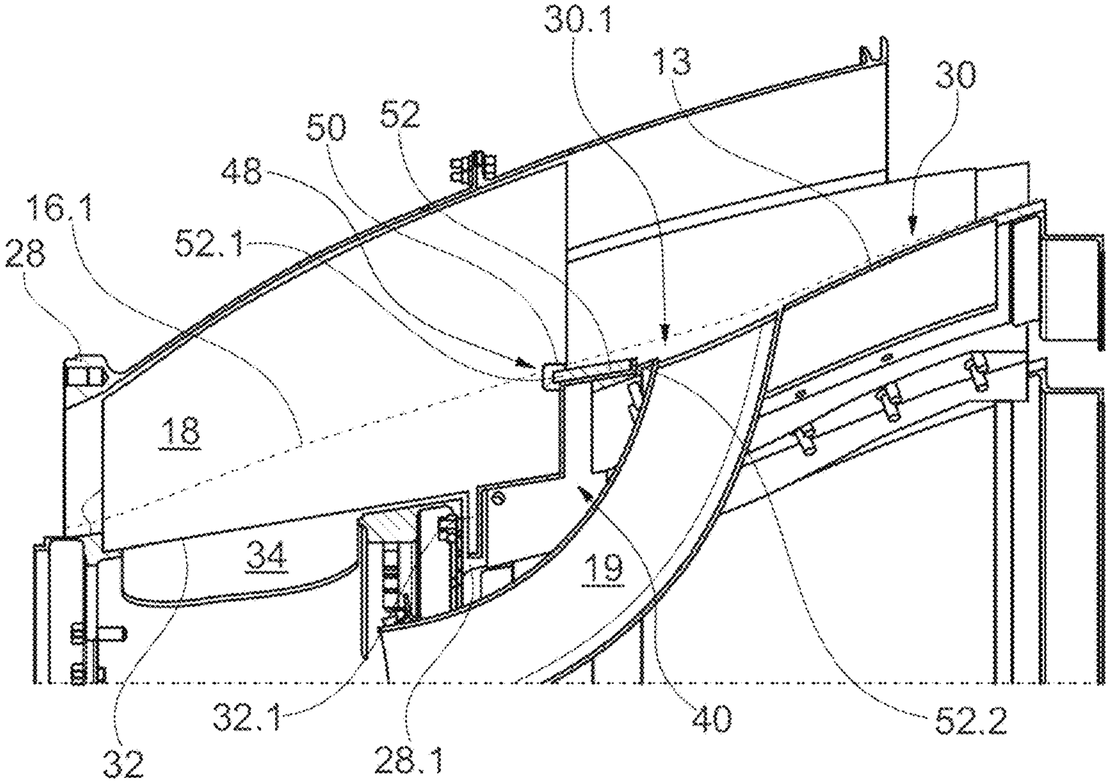
[Fig 6]
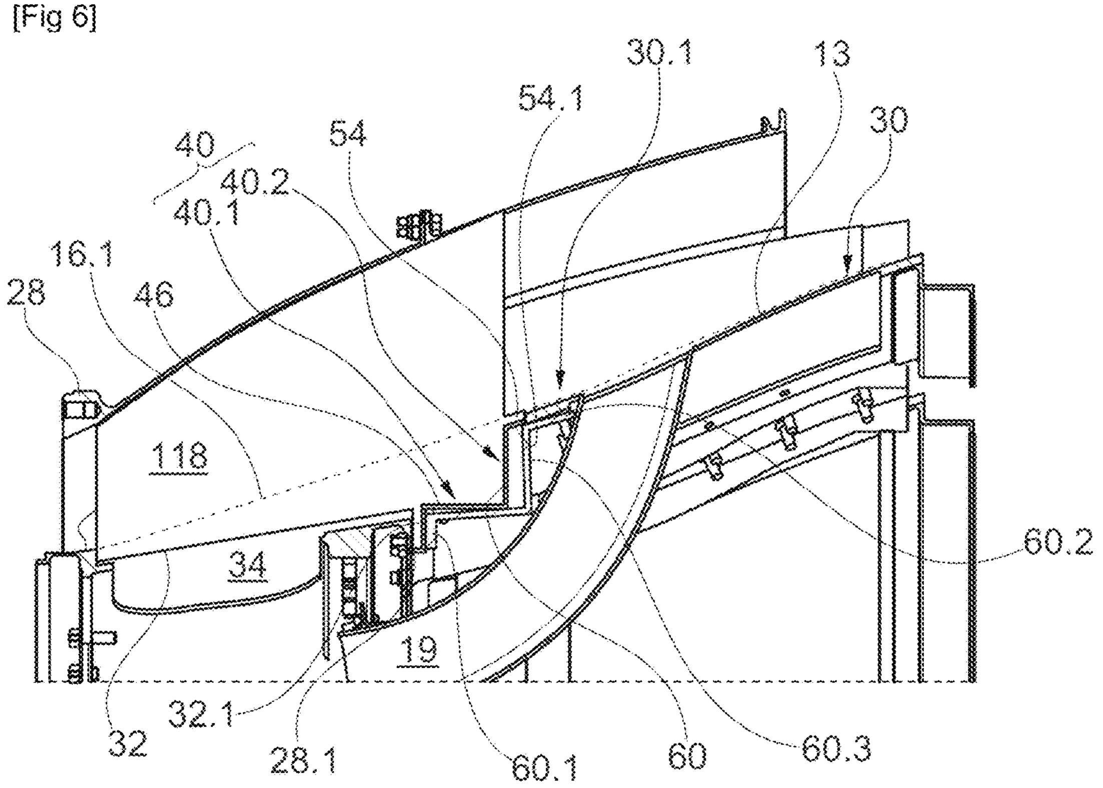

[Fig 7]
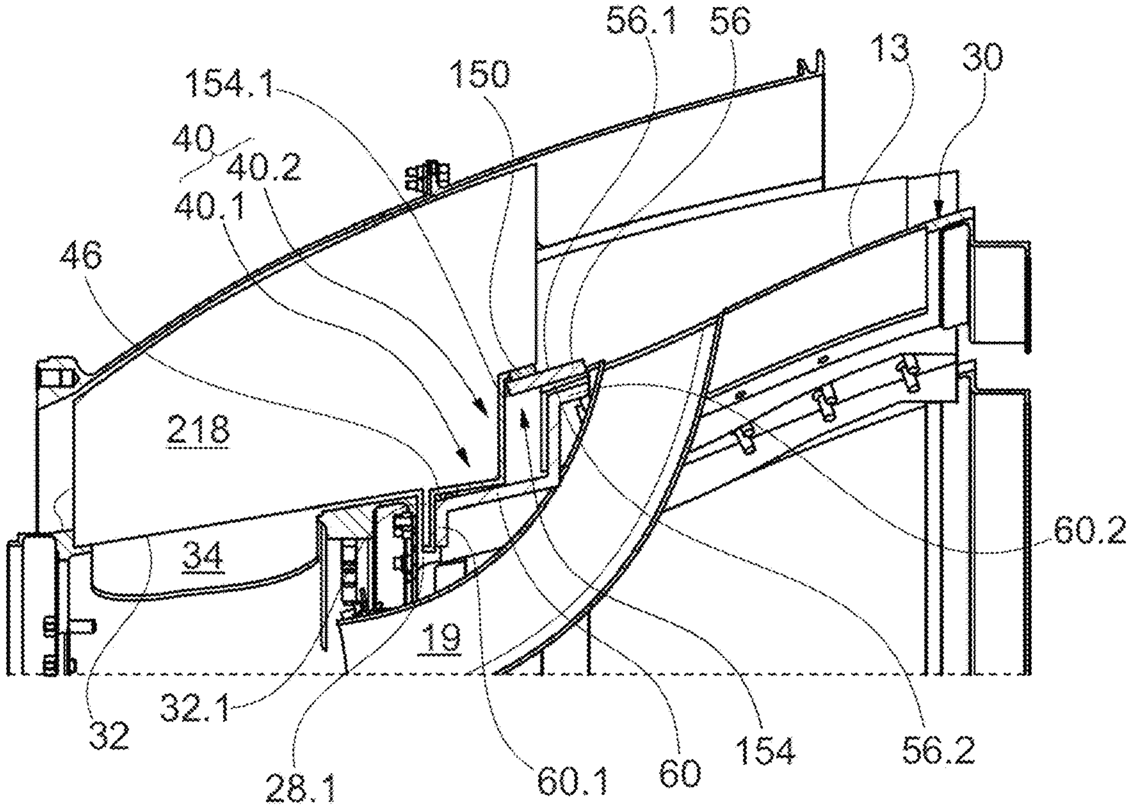
[Fig 8]
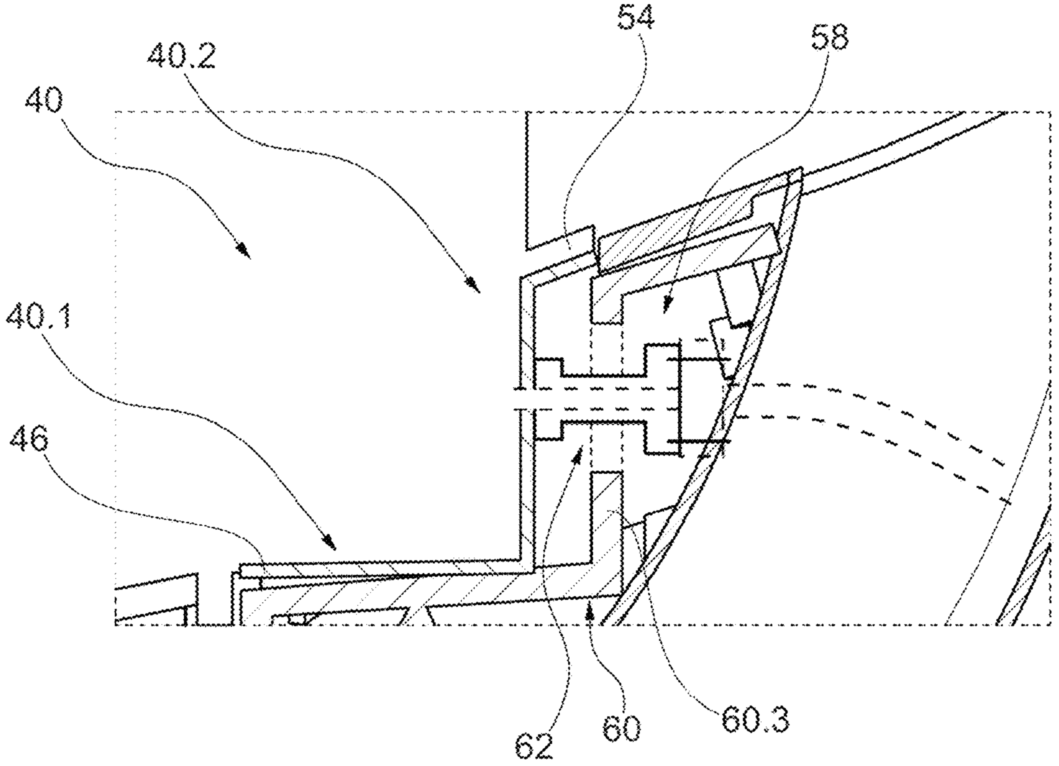

[Fig 9]
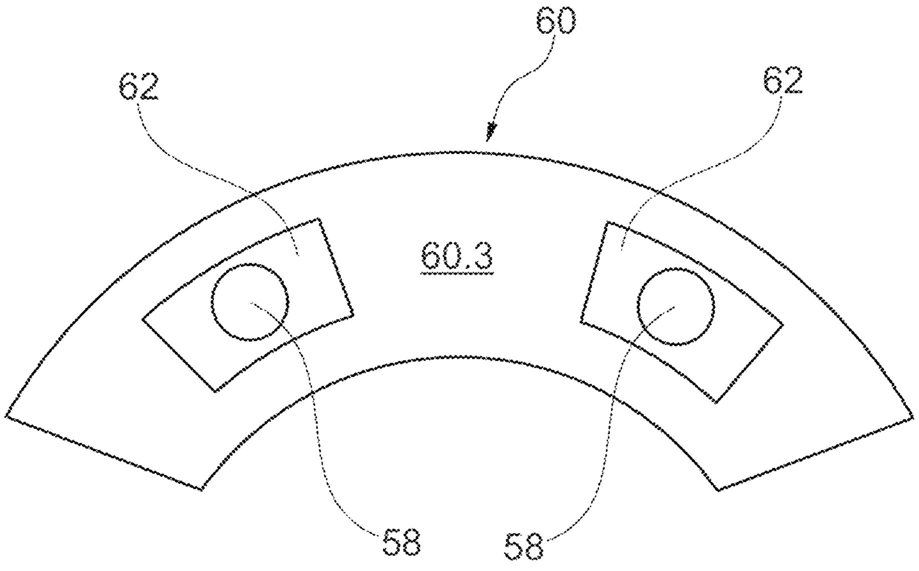

TRIPLE-FLOW AXIAL TURBOMACHINE WITH HEAT EXCHANGER

TECHNICAL FIELD

The invention relates to the field of turbomachines and more particularly to three-flow turbomachines. The invention relates to the arrangement of a heat exchanger intended for cooling the oil of the turbomachine.

PRIOR ART

Climate change is a major concern for many legislative and regulatory bodies around the world. Indeed, various restrictions on carbon emissions have been, are being or will be adopted by various states. In particular, an ambitious standard applies both to new types of aircraft but also to those in circulation requiring the implementation of technological solutions in order to make them compliant with current regulations. Civil aviation has been mobilizing for several years now to make a contribution to the fight against climate change.

Technological research efforts have already made it possible to significantly improve the environmental performance of aircraft. The Applicant takes into consideration the impact factors in all phases of design and development to obtain less energy-intensive, more environmentally friendly aeronautical components and products whose integration and use in civil aviation have moderate environmental consequences with the aim of improving the energy efficiency of aircraft.

Consequently, the Applicant is constantly working to reduce its negative climate impact by using methods and operating virtuous development and manufacturing processes and minimizing greenhouse gas emissions to the minimum possible in order to reduce the environmental footprint of its activity.

This sustained research and development work covers new generations of aircraft engines, the weight reduction of aircraft, particularly through the materials used and the lighter on-board equipment, the development of the use of electrical technologies to provide propulsion, and, as an essential complement to technological progress, aeronautical biofuels.

In this context, the invention relates more particularly to the aspects related to the arrangement of heat exchangers in turbomachines. Indeed, in a turbomachine, it is generally necessary to cool the oil of the lubrication circuit. It is known to arrange one or more heat exchanger(s) in the tertiary flow of a three-flow turbomachine, that is to say in the radially intermediate flow between the primary flow directed towards the combustion chamber and the secondary, external flow.

The integration of an exchanger in the third flow, confined between the primary flow and the secondary flow, poses difficulties of assembly and accessibility in the event of maintenance but also constraints in operation due to the thermal expansion of the exchanger. A "brick" type exchanger inspired by document FR 3 089 248 A1 does not meet these constraints and is therefore not suitable for the third flow.

The integration of an exchanger into a third flow of a three-flow turbomachine therefore presents challenges linked to its size, its assembly, its accessibility, its operation and also the overall mass of the means used to fix it to the casing.

DISCLOSURE OF THE INVENTION

The present invention aims to overcome at least one of the disadvantages of the aforementioned state of the art. More particularly, the invention aims to propose a simple, efficient, and economical solution to address the disadvantages of the design/manufacture of state-of-the-art turbomachines. In particular, the invention aims to propose a solution that allows effective cooling in a confined space without adding mass and without hindering the performance of the turbomachine, while also ensuring the safety of the turbomachine in case of fire, and the accessibility of the heat exchanger during maintenance operations.

To this end, the present invention relates to a turbomachine, comprising:

- a first separation lip capable of separating an incoming airflow into a radially internal airflow and a radially external airflow, said secondary flow;
- a second separation lip capable of separating the radially internal airflow into a primary flow and a tertiary flow, the latter flowing through a tertiary flow vein radially external to a primary flow vein traversed by the primary flow;
- a heat exchanger disposed in the tertiary flow vein; and
- an internal casing;

wherein the heat exchanger comprises a body and a flange extending radially inwardly and protruding from the body, the flange being fixed to the internal casing, the heat exchanger further comprising, downstream of the flange, a downstream part to which a fire wall forming a thermal shield is attached.

Advantageously, the fire wall corresponds to a fireproof wall that delays the propagation of a potential fire from the primary flow vein (from the combustion chamber, for example) to the rest of the aircraft (towards the aircraft nacelle). Attaching the fire wall to the heat exchanger provides a gain in overall space and also facilitates the maintenance of these elements as an additional fixation for the fire wall is no longer necessary.

According to an advantageous embodiment of the invention, the downstream part of the heat exchanger comprises a groove extending circumferentially, the turbomachine further comprising an internal shroud of the tertiary flow vein which is received in the groove.

Thus, the heat exchanger has a structural function for the assembly of other parts and is no longer just a block disposed in an airflow vein. Therefore, the shroud does not require specific fastening elements to assemble it to the casing or to ensure the continuity of the airflow guiding surface.

Preferably, the internal shroud as well as the internal casing correspond to an inter-blade shrouding of the turbomachine which is disposed between the primary flow vein and the tertiary flow vein. Advantageously, the casing and the internal shroud are in aerodynamic continuity with the tertiary flow vein, and preferably constitute a radially internal guiding wall of the tertiary flow.

According to an advantageous embodiment of the invention, the turbomachine comprises a thermal insulating seal disposed in the groove and interposed between the shroud and the heat exchanger. This seal limits the deformation of the shroud that would occur due to thermal conduction with a hot exchanger. Thus, fastening elements for the shroud to the casing, which would aim to stiffen the shroud and prevent its deformation, are not necessary.

According to an advantageous embodiment of the invention, the downstream part of the heat exchanger comprises a groove extending circumferentially, the turbomachine further comprising an internal shroud of the tertiary flow vein to which an insulating strip is attached and received in the groove.

Preferably, the insulating strip acts as an additional fire wall, similar to the fire wall of the downstream part of the heat exchanger, in order to delay the propagation of fire towards the tertiary flow vein.

Advantageously, the insulating strip further secures the connection between the shroud and the heat exchanger, forming, together with the fire wall, a thermal shield that extends axially from the flange to the shroud. In this configuration, the internal shroud is protected from the heat that may be emitted from the exchanger, and the internal shroud can advantageously be made from a composite material.

According to an advantageous embodiment of the invention, the turbomachine comprises a thermal insulating seal disposed in the groove and interposed between the strip and the exchanger.

According to an advantageous embodiment of the invention, the strip is fixed to the shroud and is mounted floating in the groove.

Advantageously, the mounting of the strip in the groove is free of any fastening and avoids creating areas of mechanical stress when the exchanger undergoes thermal expansions. To this end, the floating mounting of the shroud in the groove allows for expansion deformations in the axial, radial, and circumferential directions.

According to an advantageous embodiment of the invention, the fire wall is fixed to the flange. Thus, a fastening element (notably a screw) can be shared to fix the exchanger and the fire wall to the casing.

According to an advantageous embodiment of the invention, the fire wall at least partially follows the internal profile and the downstream profile of the downstream part of the exchanger. The overall size of the "exchanger+fire wall" assembly is therefore minimized.

Preferably, the internal profile of the downstream part is substantially parallel to the axis of the turbomachine, and the downstream profile is substantially radial.

According to an advantageous embodiment of the invention, the downstream part has an axial length between 20% and 50% of the axial length of the heat exchanger.

In this configuration, the flange extends radially inwardly and protrudes from the body, preferably in a downstream half of the heat exchanger. This facilitates assembly/disassembly from the downstream side, as the flange is easily accessible without mechanically unbalancing the cantilevered mounting of the downstream part of the heat exchanger.

According to an advantageous embodiment of the invention, the turbomachine comprises structural arms extending radially through the tertiary flow vein and delimiting inter-arm spaces, the turbomachine comprising a heat exchanger in each inter-arm space, each heat exchanger comprising a body and a flange extending radially inwardly and protruding from the respective body, each flange being fixed to the internal casing, the fire wall being attached to each of the heat exchangers. To this end, the fire wall extends circumferentially 360° around the longitudinal axis of the turbomachine, ensuring thermal insulation continuity and a thermal break capable of protecting an entire upstream and radially external part of said turbomachine from potential fire propagation.

Advantageously, the fixation of the heat exchanger in the tertiary flow vein limits aerodynamic disturbances of the flow necessary for the aircraft's thrust.

According to an advantageous embodiment of the invention, the turbomachine further comprises a fixing flange of the shroud, said flange having an upstream end fixed to the flange of the heat exchanger and the fire wall being included in the flange.

According to an advantageous embodiment of the invention, the flange comprises a radial portion overlapping radially with the downstream part of the heat exchanger, and the radial portion of the flange comprises at least one opening traversed by at least one hydraulic connection connected to the heat exchanger. The hydraulic connection allows for supplying oil to the heat exchanger and/or recovering cooled oil from said heat exchanger.

According to an advantageous embodiment of the invention, the turbomachine comprises a collar extending protrudingly and downstream from the body of the heat exchanger, said collar being flush with the shroud.

Advantageously, the collar maintains the aerodynamic continuity of the tertiary flow vein, in order to prevent any radial inward air leakage towards the fixing flange. Moreover, the collar allows for thermal insulation and further secures the connection between the shroud and the heat exchanger, creating a thermal break that extends axially from the body of the heat exchanger to the shroud. In this configuration, the internal shroud is protected from the heat that may be emitted from the heat exchanger, and the internal shroud can advantageously be made from a composite material.

According to an advantageous embodiment of the invention, a fire wall is attached to an underside of the collar.

Advantageously, the fire wall corresponds to a fireproof wall that delays the propagation of a potential fire from, for example, the primary flow vein (from the combustion chamber) to the aircraft nacelle. Attaching the fire wall to the heat exchanger provides a gain in overall space and also facilitates the maintenance of these elements as an additional fixation for the fire wall is no longer necessary. Preferably, the fire wall extends from the flange to the collar, thus forming a thermal shield over the entire downstream part of the heat exchanger.

According to an advantageous embodiment of the invention, the collar extends axially over at most 10% of a total axial length of the heat exchanger.

Advantageously, such an axial length of the collar ensures an axial separation and distancing between the downstream part of the heat exchanger and an upstream portion of the internal shroud, thereby promoting the thermal insulation of said internal shroud.

According to an advantageous embodiment of the invention, the turbomachine comprises an insulating strip interposed between the heat exchanger and the shroud, said strip having an upper surface resting on a lower surface of a groove of the heat exchanger, and a lower surface fixed to the shroud.

Preferably, the insulating strip acts as an additional fire wall, similar to the fire wall of the downstream part of the heat exchanger, in order to delay the propagation of fire towards the tertiary flow vein.

Advantageously, the insulating strip further secures the connection between the shroud and the heat exchanger, forming, together with the fire wall, a thermal shield that extends axially from the fixing flange to the shroud. In this configuration, the internal shroud is protected from the heat that may be emitted from the heat exchanger, and the internal shroud can advantageously be made from a composite material.

According to an advantageous embodiment of the invention, the turbomachine comprises a thermal insulating seal interposed between the strip and the heat exchanger.

The insulating seal allows, on the one hand, to limit the heat transfer from the hot exchanger to the internal shroud, and on the other hand, to permit, through the elastic deformation of said seal, expansion deformations in the axial, radial, and circumferential directions. Indeed, the mounting of the strip in the groove is free of any fastening, and avoids creating areas of mechanical stress when the exchanger undergoes thermal expansions.

This seal limits the deformation of the shroud that would occur due to thermal conduction with a hot exchanger. Thus, it eliminates the need for stiffening elements (which can be heavy and bulky) for the shroud that would aim to prevent its deformation.

According to an advantageous embodiment of the invention, the flange is a fire wall.

According to an advantageous embodiment of the invention, a fire wall is integrated into the exchanger or is fixed to its flange.

Preferably, the fire wall fixed to the flange corresponds to the flange being or including the fire wall and fixed to said flange.

According to an advantageous embodiment of the invention, the turbomachine comprises structural arms extending radially through the tertiary flow vein and delimiting inter-arm spaces, the turbomachine comprising a heat exchanger in each inter-arm space, each heat exchanger comprising a body and a flange extending radially inwardly and protruding from the respective body, each flange being fixed to the internal casing, the flange being common to all the exchangers and its upstream end being fixed to each of the flanges of the exchangers. To this end, the flange extends circumferentially 360° around the longitudinal axis of the turbomachine, ensuring effective support of the internal shroud.

Simultaneously, the fire wall extends circumferentially 360° around the longitudinal axis, ensuring thermal insulation continuity capable of protecting an entire upstream and radially external part of said turbomachine from potential fire propagation.

The invention also relates to a turbomachine, comprising:
- a first separation lip capable of separating an incoming airflow into a radially internal airflow and a radially external airflow, said secondary flow;
- a second separation lip capable of separating the radially internal airflow into a primary flow and a tertiary flow, the latter flowing through a tertiary flow vein radially external to a primary flow vein traversed by the primary flow;
- a heat exchanger disposed in the tertiary flow vein;
- an internal casing; and
- an internal shroud of the tertiary flow vein disposed downstream of the exchanger. wherein the heat exchanger comprises a body and a flange extending radially inwardly and protruding from the body, the flange being fixed to the internal casing, the heat exchanger comprising, downstream of the flange, a downstream part in cantilever, the turbomachine further comprising a fixing flange of the shroud, an upstream end of the flange being fixed to the flange of the heat exchanger.

The downstream part is in cantilever downstream of the fixing flange, as it is devoid of any other fixation, apart from the fixation of the heat exchanger to the shroud at the level of said fixing flange.

The said invention comprises at least one of the advantageous embodiments of the invention above.

The heat exchanger, in addition to being able to efficiently cool the oil by exchanging heat with the air, ensures additional functions, such as: the arrangement of a fire wall and the constitution of a support for the shroud. In this configuration, the number of intermediate parts that would have been introduced to separately meet the different required functions is significantly reduced, thus reducing the mass and manufacturing cost of the turbomachine of the invention. To this end, the assembly and disassembly of the heat exchanger are facilitated, thereby improving the maintainability of the turbomachine.

Moreover, the invention is particularly advantageous because the positioning of the heat exchanger at the level of the tertiary flow vein avoids obstructing the passage of air in the secondary flow and thus the engine's efficiency. This results in optimized energy efficiency and thrust, which advantageously reduce fuel consumption and greenhouse gas emissions, thereby reducing the environmental impact of aircraft.

It is understood that each detail of an embodiment below can be combined with each other detail of the other embodiments.

BRIEF DESCRIPTION OF THE DRAWINGS

FIG. 1 represents a longitudinal sectional view of a turbomachine according to the invention, said turbomachine comprising a heat exchanger in a tertiary flow vein;

FIG. 2 represents a front view of the tertiary flow vein of FIG. 1 comprising several heat exchangers;

FIG. 3 represents a sectional view of an assembly of an internal shell on the exchanger, according to a first embodiment of the invention;

FIG. 4 is an enlarged sectional and perspective view of the assembly of the internal shell on the exchanger of FIG. 3;

FIG. 5 represents a sectional view of the assembly of the internal shell on the exchanger, according to an alternative to the first embodiment of the invention.

FIG. 6 represents a sectional view of a mounting of an internal shell on the exchanger by means of a fixing flange, according to a second embodiment of the invention;

FIG. 7 represents a sectional view of a mounting of the internal shell on the exchanger by means of the fixing flange, according to a third embodiment of the invention;

FIG. 8 is an enlarged sectional view of the assembly of FIG. 6, with the flange including at least one hydraulic connection;

FIG. 9 schematically illustrates a front view of the flange comprising the at least one hydraulic connection.

DETAILED DESCRIPTION

In the following description, the terms "internal" and "external" refer to a positioning relative to the longitudinal axis of rotation of a turbomachine. The axial direction corresponds to the direction along the longitudinal axis of rotation of the turbomachine. The radial direction is perpendicular to the longitudinal axis. Upstream and downstream refer to the direction of flow of a flow in the turbomachine.

The figures show the elements schematically and are not drawn to scale. In particular, some dimensions are enlarged to facilitate reading of the figures.

FIG. 1 illustrates a turbomachine 2 comprising a propeller 4 secured to a hub 6 rotating around a longitudinal axis 8.

The turbomachine 2 moves in an air flow F whose movement relative to the turbomachine 2 is generated by the rotation of the propeller 4 and the advancement of the aircraft on which the turbomachine 2 is mounted.

The air flow F is separated by a first separation lip 10 into a radially internal air flow F' and a radially external air flow F2, called secondary flow F2. The propeller 4 can be arranged upstream of the first separation lip 10 or downstream.

The radially internal air flow F' passes through a mobile wheel 12 which directs the latter towards a second separation lip 14 capable of separating the radially internal air flow F' into a primary flow F1 and a tertiary flow F3, the latter being distinct from the secondary flow F2.

The first separation spout 10 comprises an inner wall forming a first outer guide wall 11 of the radially inner air flow F', said first outer guide wall 11 forming a convex profile seen from said radially inner air flow F'.

The second separation lip 14 comprises an external wall forming a second external guide wall 13 of the radially internal air flow F' having passed through the mobile wheel 12, said second external guide wall 13 forming a convex profile seen from the tertiary flow F3. For this purpose, the second external guide wall 13 corresponds to a radially internal guide wall 13 of the tertiary flow F3.

The tertiary flow F3 enters a tertiary flow vein 16 radially external to said primary flow F1. The tertiary flow F3 passes through a heat exchanger 18, 118, 218 arranged in the tertiary flow vein 16.

The heat exchanger 18, 118, 218 extends radially and axially in the tertiary flow vein 16, and preferably in an upstream section 20 of the tertiary flow vein 16, having a longitudinal section diverging in the direction of flow of the tertiary flow F3.

The heat exchanger 18 is arranged axially approximately between the high pressure compressor 15 and the low pressure compressor 17 called "booster" 17, at right angles to an inter-compressor casing.

The high pressure 15 and low pressure 17 compressors comprise rotating blades and rectifier blades arranged in a primary flow vein 21 crossed by the primary flow F1, the latter heading towards a combustion chamber 23.

A "VBV" channel 19 (Variable Bleed Valve) opens axially downstream of the heat exchanger 18 into the tertiary flow 16. It provides a discharge function by returning part of the primary flow F1 to the tertiary flow F3 to prevent the high pressure compressor 15 from becoming blocked when the flow rate of the primary flow F1 becomes too low.

The heat exchanger 18, 118, 218 can extend continuously over 360° in the upstream section 20 of the vein 16 around the longitudinal axis 8 of the turbomachine 2.

Preferably, the turbomachine 2 comprises several heat exchangers 18 extending in the tertiary flow vein 16 and subdividing the vein angularly in a discontinuous manner over 360° around the longitudinal axis 8. Each of said exchangers can independently provide a heat exchange function between the air and a fluid.

A single heat exchanger 18, 118, 218 can combine the cooling of several functions or oil circuits of the turbomachine, and this according to different parameters linked to the need for cooling the oil, ie, inlet temperatures, flow rates, required outlet temperature or air conditions, the various circuits can be put in thermal contact or well insulated. The exchanger 18 and in particular its oil passages can withstand a low oil temperature of up to −54° C.

The upstream section 20 of the tertiary flow vein 16 comprises an external fairing 24 and an inter-vein cowling 26, at least one of the external fairing 24 and inter-vein cowling 26 being rigidly connected to the exchanger 18. Preferably, the inter-vein cowling 26 is fixed to the exchanger 18. Such a fixing will be detailed later in this description.

The inter-vein cowling 26 comprises an internal casing 28, arranged axially between the high-pressure compressor 15 and the low-pressure compressor 17, and further comprises an internal shell 30 arranged downstream of the exchanger 18. In this configuration, the internal casing 28 and the internal shell 30 constitute, with the exchanger 18, 118, 218, the radially internal guide wall of the tertiary flow F3.

FIG. 2 is a front view, ie in the direction opposite to the air flow, of the tertiary flow vein 16 of FIG. 1 comprising several heat exchangers 18, 118, 218. It can be seen that the exchangers 18, 118, 218 are distributed angularly in the tertiary flow vein 16.

The turbomachine 2 comprises structural arms 34 extending radially across the tertiary flow vein 16 and delimiting between them inter-arm spaces 36. Preferably, the turbomachine 2 comprises between 2 and 20 structural arms 34.

At the same time, the inner ferrule may be single-piece and circumferentially continuous over 360°, or said ferrule may be subdivided into several internal ferrules of up to 5 ferrules.

The exchanger 18, 118, 218 is preferably obtained by additive manufacturing, said exchanger 18, 118, 218 extending circumferentially between two structural arms 34 in each inter-arm space 36.

The exchanger 18, 118, 218 comprises heat exchange surfaces 38 corresponding to oil passages and/or heat exchange surfaces with air extending radially and axially in the inter-arm space 36. An example of possible designs is detailed in patent applications BE2021/5978, BE2021/5979, BE2021/5980, BE2021/5982 and BE2021/5983, the design of the heat exchange surfaces 38 or of the internal oil passages not being the core of the present invention.

The exchanger 18, 118, 218 comprises a body 32 with a flange 32.1 extending radially internally and projecting from said body 32, such that the flange 32.1 is fixed to an annular flange 28.1 belonging to the internal casing 28. Said annular flange 28.1 is preferably continuous over 360° around the longitudinal axis of the turbomachine while the flange 32.1 of the exchanger 18, 118, 218 preferably has a restricted extent: the flange 32.1 is in a central position relative to the body 32, in the circumferential direction. This advantageously allows free rein for thermal expansions of the exchanger 18, 118, 218 by allowing the latter to extend tangentially in the inter-arm space 36.

The direction of assembly of the exchanger 18, 118, 218 in the turbomachine is preferably from downstream to upstream. In this configuration, the fixing of the exchanger 18, 118, 218 to the internal casing 28 can be ensured by screwing. Thus, the flange 32.1 can be fixed to the annular flange 28.1 by means of two to six screws, and more preferably by means of three screws.

The exchanger 18, 118, 218 also comprises a downstream portion 40 arranged downstream of the flange 32.1 and therefore mounted in a cantilever manner. This downstream portion 40 has an internal surface with an internal profile 40.1, for example cylindrical or conical, around the longitudinal axis of the turbomachine, and a downstream surface having a downstream profile 40.2 substantially perpendicular to the longitudinal axis. Alternatively, the shape of the downstream portion 40 may be freer, as inspired by document EP 3 674 531 A1.

Preferably, the downstream surface 40.2 of the exchanger 18 comprises an oil inlet 42 at an angular end of the body 32, and an oil outlet 44 at a circumferentially opposite end.

The oil inlet 42 and the oil outlet 44 are fluidically connected to an oil collector and an oil distributor arranged in an internal part (not shown) of the body 32 of the exchanger 18, 118, 218. Preferably, the internal part of the body 32 can be hollow and devoid of material (apart from the oil collector and distributor and the fluid connections), so as to lighten the exchanger 18, 118, 218.

The downstream part 40 of the exchanger 18 according to the first embodiment of the invention comprises on its downstream surface 40.2 a groove 48 which is intended to receive, directly or not, the shell 30 (see FIGS. 3-5).

At the downstream surface 40.2, and radially external to the oil inlet 42 and the oil outlet 44, the exchanger 118 according to a second embodiment of the invention, comprises a collar 54 extending in projection and downstream from the body 32 of the exchanger 18. While the exchanger 218 according to a third embodiment of the invention, comprises a notch 154. The different embodiments will be detailed below in this description.

FIG. 3 shows a sectional view of the assembly of the internal shell 30 on the exchanger 18, according to a first embodiment of the invention.

The downstream part 40 comprises a fire wall 46 capable of delaying the propagation of a downstream fire upstream of the turbomachine 2.

The fire wall 46 may correspond to a layer of insulating material such as a high-performance plastic. Preferably, the fire wall 46 is a polyimide. Vespel® available from DuPont™. Advantageously, polyimide Vespel® is a plastic resistant to cracking at very high temperatures with excellent friction and wear characteristics. Unlike most plastics, Vespel® does not produce significant gassing even at high temperatures.

Preferably, the fire wall 46 is fixed to the flange 32.1 and extends from said flange 32.1 to a groove 48 arranged at right angles to the downstream surface 40.2, radially external to the oil inlet 42 and to the oil outlet 44. The fixing of the fire wall 46 on the body 32 of the exchanger can be ensured by gluing or by screwing.

Alternatively, the fire wall 46 is preferably integrally formed with the body 32. In this regard, the body 32 and the fire wall 46 are both formed of aluminum. In this configuration, the fire wall 46 corresponds to an aluminum wall that can be further thickened relative to the rest of the body 32. Indeed, the fire wall 46 is sufficiently thick to provide resistance to a possible fire.

The flange 32.1 of each exchanger 18 is fixed to the internal casing 28, and the fire wall 46 is fixed to each flange 32.1. For this purpose, the fire walls 46 of all the exchangers 18 extending in the vein advantageously make it possible to cut with the structural arms 34, a common circumferential thermal bridge, thus protecting the entire upstream part of the turbomachine over 360°.

Preferably, the groove 48 extends circumferentially over the entire circumferential extent of the downstream part 40. This allows the internal shell 30 of the inter-vein cowling 26 of FIG. 1 to be supported by the exchanger 18.

For this purpose, the mounting of the internal shell 30 on the exchanger 18 is carried out according to two embodiments (FIGS. 3 and 4 on the one hand, and FIG. 5 on the other hand).

Still in connection with FIG. 3, it can be seen that the internal shell 30 is received in the groove 48 with a thermal insulating seal 50 arranged in the groove 48 and interposed between the shell 30 and the exchanger 18.

Preferably, the mounting of the internal shell 30 in the groove 48 is a floating mounting and devoid of any fixing.

In this regard, the thermal insulating seal 50 is an elastomer capable of cutting the thermal bridge between the shell 30 and the exchanger 18. Preferably, the seal 50 is a polyimide. Vespel® available from DuPont™. This seal 50 can therefore be similar to the material of the fire wall 46. However, the seal 50 can be obtained from a material different from that of the fire wall 46.

Advantageously, the seal 50 may have elastic mechanical properties allowing it to absorb part of the thermal expansions of the exchanger 18 in the axial and radial directions, so as to avoid propagation of mechanical stresses towards the shell 30 and to protect against any risk of deformation and/or cracking.

The downstream part 40 has an axial length of between 10% and 50% of the axial length of the exchanger 18, and preferably between 20% and 50%, and more preferably between 20% and 40%. Such an axial length makes it possible to extend the axial coverage of the fire wall 46 and therefore to further extend the protection axially, without penalizing the mechanical balance of the exchanger: a downstream part that is too large would require other means of fixing downstream of the exchanger and this would affect the size and simplicity of the assembly.

Preferably, the fire wall 46 matches the internal profile 40.1 and the downstream profile 40.2 of the downstream part 40 of the exchanger 18, and extends radially over the flange 32.1 and up to the groove 48. Advantageously, and in addition to protecting the turbomachine from the spread of fire, the fire wall 46 makes it possible to protect the shell 30 from the high temperatures of the exchanger 18.

The internal shell 30 may advantageously be made from a composite material. For example, the internal shell 30 may be made from carbon fiber.

Indeed, the maximum temperature that the fire wall 46 and the seal 50 can reach during operation of the exchanger 18 is lower than the maximum temperature that can be tolerated by the composite material forming the internal shell 30.

The direct mounting of the internal shell 30 on the exchanger by means of the groove 48 is advantageously carried out from downstream to upstream, and by simple insertion, thus facilitating the accessibility of the exchanger 18 and its maintainability.

The seal 50 matches, on one side, the hollow shape of the groove 48, and on the other side the shape of an upstream portion 30.1 of the ferrule.

FIG. 4 is an enlarged sectional and perspective view of the assembly of the internal shell 30 on the exchanger 18. This is precisely an enlarged view of the upstream portion 30.1 of the shell 30 inserted into the groove 48.

With reference to FIG. 4, the upstream portion 30.1 preferably comprises an upstream spout 30.2, the seal 50 matches the shape of said upstream spout 30.2 so as to ensure fluid sealing between the shell 30 and the exchanger 18.

The upstream portion 30.1 further comprises a platform 30.3 arranged radially externally to the upstream spout 30.2 and flush with the radially internal guide wall 13, so as to follow the aerodynamic line 16.1 of the air flow in the tertiary flow vein 16 illustrated in FIG. 1.

In this configuration, the downstream surface 40.2 may comprise a housing 49 capable of receiving the platform 30.3 and preventing air leaks towards an inter-vein compartment 27 of the inter-vein cowling 26 of FIG. 1.

FIG. 5 shows a sectional view of the assembly of the internal shell 30 on the exchanger 18 according to an alternative to the first embodiment of the invention.

It can be seen in FIG. 5 that, in this embodiment, the internal shell 30 is indirectly supported by the exchanger 18. In fact, the upstream portion 30.1 comprises an insulating tab 52 which is received in the groove 48.

Preferably, the tab 52 comprises a downstream portion 52.2 which is fixed by riveting to the upstream portion 30.1 of the internal shell 30.

The insulating tab 52 comprises a beak 52.1 preferably having a shape similar to the upstream beak 30.2 of FIG. 4, and the mounting of the tab 52 in the groove 48 is floating.

In this configuration, the seal 50 matches the shape of the tab 52 and makes it possible to cut the thermal bridge between the shell 30 and the exchanger 18.

Preferably, the tab 52 is formed from an insulating material, said material being able to correspond to that of the fire wall, i.e. polyimide Vespel®.

Advantageously, the fire wall 46, according to the embodiment of FIG. 5, extends in the downstream part 40 of the exchanger 18, from the flange 32.1 and towards the fixed downstream portion 52.2 of the tab 52.

For this purpose, the upstream portion 30.1 is not in direct contact with the seal 50, thus minimizing the transfer of heat dissipated by the exchanger 18 to the shell 30. Also, this allows more freedom when designing the exchanger 18 and the shell 30, the tab 52 being able to serve as an adjustment variable filling the gap between these two elements. This design versatility is illustrated by representing an exchanger 18 in FIG. 5 which is axially shorter than that of FIG. 2.

Advantageously, the fire wall 46 makes it possible to ensure the cutting of the thermal bridge capable of protecting an entire upstream and radially external part of the turbomachine from the spread of fire.

The tab 52 comprises a low mass, thus allowing the turbomachine of the invention to have a considerably reduced mass compared to state-of-the-art turbomachines.

Being fixed only to the shell 30 and being floating in the exchanger 18, the tab 52 also facilitates the assembly and disassembly of the exchanger, which makes it possible to save time during assembly and to improve the maintainability of the turbomachine.

FIG. 6 shows a sectional view of a mounting of the internal shell 30 on the exchanger 118 by means of a fixing flange 60, according to the second embodiment of the invention.

Elements identical to those of the first embodiment are designated by the same reference numbers, while elements exhibiting differences will be incremented by 100.

Preferably, the collar 54 and/or the notch 154 extends circumferentially over the entire circumferential extent of the downstream part 40.

It can be seen that the fixing flange 60 of the internal shell 30 comprises an upstream end 60.1 directly fixed to the flange 32.1. In this regard, the flange 32.1 is preferably fixed by screwing to the internal casing 28, and the upstream end 60.1 is also screwed onto the flange 32.1 by means of the same screws assembling the flange 60 to the internal casing 28.

The flange 60 comprises a downstream end 60.2 opposite the upstream end 60.1, said downstream end 60.2 being rigidly connected to an upstream portion 30.1 of the shell 30. Preferably, the rigid connection between the flange 60 and the shell 30 corresponds to bolting and/or riveting. In this configuration, the shell 30 is attached to the casing via the flange 32.1 of the exchanger 118. This may be the only upstream attachment of the shell 30. FIG. 6 shows a downstream attachment of the shell 30 that we will not discuss in detail here.

The downstream portion 40 of the exchanger 118 comprises the collar 54 extending towards the shell 30, and preferably flush with the upstream portion 30.1. For this purpose, the collar 54 is flush with the radially internal guide wall 13.

Thus, the collar 54 allows the tertiary flow to follow the aerodynamic line 16.1 in the tertiary flow vein 16 illustrated in FIG. 1. The aerodynamic continuity ensured by the collar 54 makes it possible to avoid air leaks towards an inter-vein compartment 27 of the inter-vein cowling 26 of FIG. 1.

The collar 54 may be integral with the body 32 and may extend axially to a downstream junction 54.1 over at most 10% of a total axial length of the exchanger 118, and preferably over 5% of said length.

Preferably, the fire wall 46 extends to a lower surface 54.1 of the collar 54. This makes it possible to effectively cut the thermal bridge between the shell 30 and the exchanger 118.

The flange 60 may correspond to a second fire wall in addition to the fire wall 46 of the downstream part 40 of the exchanger 118. In this configuration, the protection against fire and the thermal insulation of the components is maximized.

Alternatively, the flange 60 may comprise the fire wall and the downstream portion 40 of the exchanger 118 may be devoid of a fire wall. This makes it possible to simplify the manufacture of the exchanger 118.

FIG. 7 shows a sectional view of a mounting of the internal shell 30 on the exchanger 218 by means of the fixing flange 60, according to the third embodiment of the invention.

The turbomachine 2 comprises an annular insulating tab 56 interposed between the exchanger 218 and the shell 30, said tab 56 comprising an upper surface 56.1 bearing on a lower surface 154.1 of a notch 154 of the exchanger 218, and a lower surface 56.2, fixed to the shell 30.

Preferably, a downstream portion of the tab 56 is fixed by riveting to the upstream portion 30.1 of the internal shell 30.

The tab 56 is preferably formed from an insulating material, said material being able to correspond to that of the fire wall, ie polyimide Vespel®.

The lower surface 154.1 of the notch 154 is preferably parallel to the upper surface 56.1 of the tab 56. Preferably, the contact between the tab 56 and the exchanger 218 is an indirect contact because a thermal insulating seal 150 is interposed between the lower surface 154.1 of the notch 154 and the upper surface 56.1.

In this configuration, the gasket 150 makes it possible to cut the thermal bridge between the shell 30 and the exchanger 18, thus making it possible to minimize the transfer of heat dissipated by the exchanger 218 to the shell 30. Also, this allows more freedom when designing the exchanger 218 and the shell 30, the tab 56 being able to serve as an adjustment variable filling the gap between these two elements. This design versatility is illustrated by representing an exchanger 218 in FIG. 7 which is less bulky than that of FIG. 6.

In this regard, the seal 150 is an elastomer capable of cutting the thermal bridge between the shell 30 and the exchanger 218. Preferably, the seal 150 is a polyimide. Vespel® available from DuPont™. This 150 gasket can therefore be similar to the material of the fire wall. However, the 150 gasket can be obtained from a different material than that of the fire wall.

The tab 56 comprises a low mass (similarly to the tab 52 of the exchanger 18 according to the embodiment of FIG. 5), thus allowing the turbomachine of the invention to have a considerably reduced mass compared to the turbomachines of the state of the art.

Advantageously, the fire wall 46 extends in the downstream part 40 of the exchanger 218, from the flange 32.1 and towards the lower surface 154.1 of the notch 154.

The fire wall 46 ensures the thermal bridge is cut off, capable of protecting an entire upstream and radially external part of the turbomachine from the spread of fire.

Being fixed only to the shell 30 and being floating in the exchanger 218, the tab 56 also facilitates the assembly and disassembly of the exchanger, which makes it possible to save time during assembly and to improve the maintainability of the turbomachine. Also, this assembly leaves free rein to local deformations (thermal expansion) of the tab 56.

FIG. 8 is an enlarged sectional view of the assembly of FIG. 6, with the flange 60 comprising at least one hydraulic connection 58 directly connected to the downstream surface 40.2 of the exchanger 118. It is understood that a comparable design can be made for the variants presented in FIGS. 3 to 5 and in FIG. 7.

The hydraulic connection 58 corresponds to a fluid connection between the exchanger 118 with other components of the turbomachine, i.e. lubrication group, engine, gearbox, engine generator or any electronic component requiring cooling).

A first connection 58 may be directly connected to the oil inlet 42, and the second connection 58 is connected to the oil outlet 44 illustrated in FIG. 2.

It can be seen in FIG. 8 that the flange 60 comprises openings 62 allowing the connections 58 to pass through. These openings 62 can be arranged on a radial portion 60.3 of the flange 60 which is in radial overlap with the downstream part 40 of the exchanger.

FIG. 9 schematically illustrates a front view of the flange 60 comprising two openings 62, each being crossed by the hydraulic connection 58.

Preferably, each opening 62 is opposite the oil inlet 42 or the oil outlet 44.

Alternatively, a seal (not shown) may be integrated between the hydraulic connection 58 and the corresponding opening 62. For this purpose, in the case where the flange 60 corresponds to the fire wall, the flange 60 may be capable of providing suitable thermal protection to the turbomachine so as to avoid any fault at the opening 62.

The invention claimed is:

1. A turbomachine, comprising:

a first separation lip capable of separating an incoming airflow into a radially internal airflow and a radially external airflow;

a second separation lip capable of separating the radially internal airflow into a primary flow and a tertiary flow, the tertiary flow flowing through a tertiary flow vein radially external to a primary flow vein traversed by the primary flow;

a heat exchanger disposed in the tertiary flow vein;

an internal casing; and an internal shroud of the tertiary flow vein disposed downstream of the heat exchanger;

wherein the heat exchanger comprises a body and a flange extending radially inwardly and protruding from the body, the flange being fixed to the internal casing, the heat exchanger further comprising a downstream part downstream of the flange, and a fire wall forming a thermal shield, said fire wall being attached to the downstream part and integrally formed with said downstream part, and the turbomachine further comprising a fixing flange of the internal shroud including an upstream end fixed to the flange of the heat exchanger and the fire wall being included in the fixing flange.

2. The turbomachine according to claim 1, wherein the downstream part of the heat exchanger comprises a groove extending circumferentially, the shroud being received in the groove.

3. The turbomachine according to claim 2, further comprising a thermal insulating seal disposed in the groove and interposed between the shroud and the heat exchanger.

4. The turbomachine according to claim 1, wherein said fixing flange comprises a radial portion overlapping radially with the downstream part of the heat exchanger, and the radial portion of the fixing flange comprises at least one opening traversed by at least one hydraulic connection connected to the heat exchanger.

5. The turbomachine according to claim 1, further comprising a collar extending protrudingly and downstream from the body of the heat exchanger, said collar being flush with the internal shroud.

6. The turbomachine according to claim 5, wherein the fire wall is attached to an underside of the collar.

7. The turbomachine according to claim 1, further comprising an insulating strip interposed between the heat exchanger and the internal shroud, said insulating strip comprising an upper surface resting on a lower surface of a groove of the heat exchanger, and a lower surface fixed to the internal shroud.

8. The turbomachine according to claim 7, further comprising a thermal insulating seal interposed between the insulating strip and the heat exchanger.

9. The turbomachine according to claim 1, wherein the downstream part of the heat exchanger comprises a groove extending circumferentially, the turbomachine further comprising an insulating strip attached to the internal shroud and received in the groove.

10. The turbomachine according to claim 9, further comprising a thermal insulating seal disposed in the groove and interposed between the insulating strip and the heat exchanger.

11. The turbomachine according to claim 9, wherein the insulating strip is fixed to the internal shroud and is mounted floating in the groove.

12. The turbomachine according to claim 1, wherein the fire wall is fixed to the flange.

13. The turbomachine according to claim 1, wherein the fire wall at least partially follows an internal profile and a downstream profile of the downstream part of the heat exchanger.

14. The turbomachine according to claim 1, wherein the downstream part defines an axial length between 20% and 50% of an axial length of the heat exchanger.

15. The turbomachine according to claim 1, further comprising structural arms extending radially through the tertiary flow vein and delimiting inter-arm spaces, the turbomachine comprising a plurality of the heat exchangers, wherein one of the plurality of the heat exchangers is in each of the inter-arm spaces, the flange of each of the plurality of the heat exchangers being fixed to the internal casing, the fire wall being fixed to each of the plurality of the heat exchangers.

* * * * *